US009820012B2

(12) United States Patent
Malhotra et al.

(10) Patent No.: US 9,820,012 B2
(45) Date of Patent: Nov. 14, 2017

(54) SEAMLESS AD INSERTION FOR MULTICAST STREAMS

(71) Applicant: Verizon Patent and Licensing Inc., Arlington, VA (US)

(72) Inventors: Punitma Malhotra, San Jose, CA (US); Johannes P. Schmidt, Los Altos Hills, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 14 days.

(21) Appl. No.: 14/945,014

(22) Filed: Nov. 18, 2015

(65) Prior Publication Data

US 2017/0142496 A1    May 18, 2017

(51) Int. Cl.
| | |
|---|---|
| *H04N 21/81* | (2011.01) |
| *H04N 21/462* | (2011.01) |
| *H04N 21/439* | (2011.01) |
| *H04N 21/2668* | (2011.01) |
| *H04N 21/458* | (2011.01) |
| *H04N 21/6405* | (2011.01) |
| *H04L 29/06* | (2006.01) |
| *H04L 12/911* | (2013.01) |

(52) U.S. Cl.
CPC ........... *H04N 21/812* (2013.01); *H04L 47/78* (2013.01); *H04L 65/4069* (2013.01); *H04L 65/607* (2013.01); *H04N 21/2668* (2013.01); *H04N 21/4392* (2013.01); *H04N 21/458* (2013.01); *H04N 21/4622* (2013.01); *H04N 21/6405* (2013.01)

(58) Field of Classification Search
CPC ............. H04N 21/812; H04N 21/4622; H04N 21/4392; H04N 21/2668; H04N 21/458; H04N 21/6405; H04L 65/4069; H04L 65/607; H04L 47/78
See application file for complete search history.

(56) References Cited

U.S. PATENT DOCUMENTS

2014/0368734 A1* 12/2014 Hoffert ............... H04N 5/44591
  348/564
2016/0073176 A1* 3/2016 Phillips ............... H04N 21/2402
  725/35

* cited by examiner

*Primary Examiner* — Benjamin R Bruckart
*Assistant Examiner* — Aklil Tesfaye

(57) ABSTRACT

Techniques described herein may be used to seamlessly insert advertisements into media programs without a significant change in required bandwidth. A client device (e.g., a smartphone, a set-top box, etc.) may begin downloading and presenting a program to a user in real-time. Before a scheduled advertisement period, the client device may stop downloading the program and begin downloading the advertisement, while continuing to present the program from a buffer. As such, the client device may seamlessly transition from the program to the advertisement in accordance with the advertisement period. The advertisement may be downloaded at an enhanced rate so that the advertisement is completely downloaded prior to the termination of the advertisement period. As such, the client device may resume downloading the program before the advertisement is over, such that the client device may seamless transition back to the program once the advertisement is over.

20 Claims, 7 Drawing Sheets

SEAMLESS AD INSERTION FOR MULTICAST STREAMS

BACKGROUND

Media content (e.g., television shows, movies, etc.) is often made available to users via a client device, such as a set-top-box (STB), a laptop computer, a smartphone, etc. For example, a STB may communicate with a content server to determine what types of media content (e.g., televisions shows, movies, sporting events, etc.) are currently available for viewing. The STB may present the available media content via a display device, such as a television, and the user may operate a remote control to select the media content of his or her choice. The client device may then begin to stream or download the media content to the client device, and display the media content via the television. At times, the media content may be interrupted by advertisements that are also downloaded by the client device and displayed to the user.

BRIEF DESCRIPTION OF THE DRAWINGS

Embodiments of the present disclosure will be readily understood by the following detailed description in conjunction with the accompanying drawings. To facilitate this description, like reference numerals may designate like structural elements. Embodiments of the disclosure are illustrated by way of example and not by way of limitation in the figures of the accompanying drawings.

DETAILED DESCRIPTION OF PREFERRED EMBODIMENTS

Figure 1:
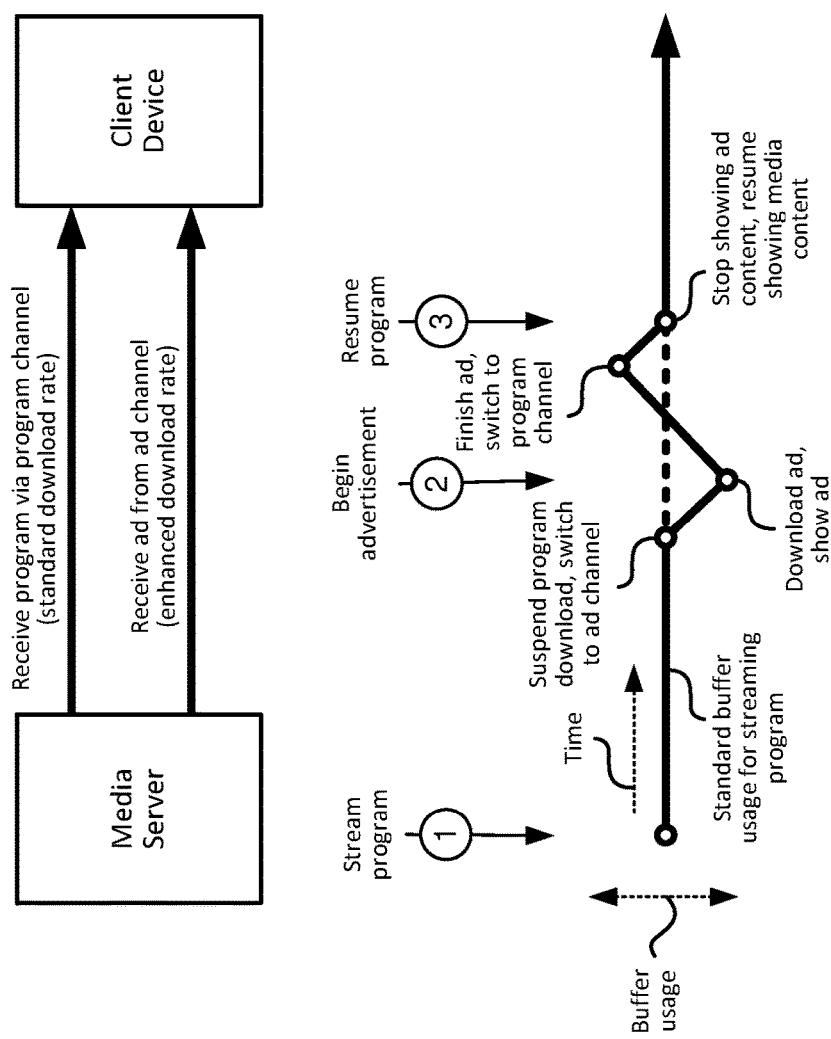
FIG. 1 illustrates an example overview of an implementation described herein.

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the present invention is defined by the appended claims and their equivalents.

As mentioned above, media content (e.g., television shows, movies, sporting events, etc.) may be available to a user via a client device (also referred to herein as a user device) that is in communication with a media server. The media content may be streamed or downloaded by the client device, from the media server, and displayed by the client device to the user. Additionally, the media content may be periodically interrupted by an advertisement (or "ad") that is also downloaded by the client device and displayed to the user. As such, the client device may be required to suddenly transition from streaming media content to streaming ad content, and then transition back again to streaming the media content once the ad is over.

Such transitions may cause glitches (e.g., abrupt visual interruptions or other undesirable visual effects) as the client device switches back and forth between a media content stream and an ad content stream. In some implementations, a client device may be capable of streaming media content and ad content simultaneously (e.g., via separate channels). However, doing so can impose a significant burden on service provider networks by doubling the bandwidth allocated to client devices. As such, currently available solutions for inserting ads into media content often result in unwanted glitches or cumbersome and prohibitive bandwidth allocations.

Techniques described herein may be used to seamlessly insert ads into a media content stream by smoothly alternating between download channels with different download rates or by alternating between download channels that encode media content and advertisements using different bit rates. For example, a client device may stream media content from a media server by downloading the media content from the media server, implementing a memory buffer to temporarily store the media content, and displaying the media content to a user. Additionally, the client device may download the media content using a first channel (e.g., a media content channel) that may have a download rate that is commensurate with watching a live television broadcast, streaming media content in real-time, etc.

At some point, an advertisement may be scheduled to temporarily interrupt the media content stream. Leading up to the advertisement, the client device may suspend the downloading and buffering of the media content, thereby freeing up buffer capacity. When the scheduled time for the advertisement arrives, the client device may switch to a second channel, download the ad content from an ad server, temporarily store the ad content in the buffer, and display the ad content to the user. The second channel may have a download rate that is greater than real-time (e.g., greater than the rate at which the advertisement is presented to the user) such that all of the ad content may be downloaded prior to the complete advertisement being shown to the user. In some implementations, the second channel may have the same or a similar download rate as the first channel but the advertisement may be encoded using a lower bit rate than what is used for the media content. Between the time that the ad content has finished downloading and the remainder of the advertisement having been shown to the user, the client device may resume downloading and buffering the media content using the first channel. As such, advertisements may be smoothly inserted into a media content stream by downloading media content and ad content using download channels with different download rates.

FIG. 1 illustrates an example overview of an implementation described herein. As shown in FIG. 1, a client device may be capable of receiving a program (e.g., a television show, a movie, etc.) from a media server via a program channel and an ad (e.g., an advertisement for a product or service) from an ad channel. The program channel may include a standard download rate, which may include a download rate that enables a user of the client device to watch a live television program, stream a movie from the media server in real-time, etc. The ad channel may include an enhanced download rate, which may include a download rate that is faster than would be necessary to watch a live advertisement, stream an ad from the media server in real-time.

The client device may alternate between the program channel and the ad channel in order to seamlessly insert advertisements into a program that is being streamed from the media server. For instance, as shown in FIG. 1, the client device may begin streaming a program from the media server (at 1). Streaming the program may include implementing a buffer for the streaming program to help ensure that, for example, the program is presented to the user in a smooth manner. Prior to a scheduled advertisement, the client device may suspend the program download but continue showing the program from the buffered program information, which may cause a decrease in buffer usage as shown in FIG. 1.

With the download suspended, the client device may switch to the ad channel and start downloading the ad. As such, since the client device started downloading and buffering the advertisement while the program was still being shown, the client device may seamlessly transition from displaying the program to displaying the advertisement according to the designated schedule (at 2). Additionally, since the ad channel includes a download rate that is greater than live or real-time programming, the buffer usage may increase as the client device downloads the advertisement, and the advertisement may finish downloading prior to the client device showing the entire advertisement.

Between the times that the advertisement finishes downloading and the advertisement finishes playing, the client device may switch back to the program channel and resume downloading the program. During the period of switching from downloading the ad to downloading the program channel, there may be no downloads and the overall buffer usage may decrease. As such, since the client device resumed downloading and buffering the program prior to the ad finishing, the client device may seamlessly transition back into the program once the program is scheduled to resume (at 3).

Figure 2:
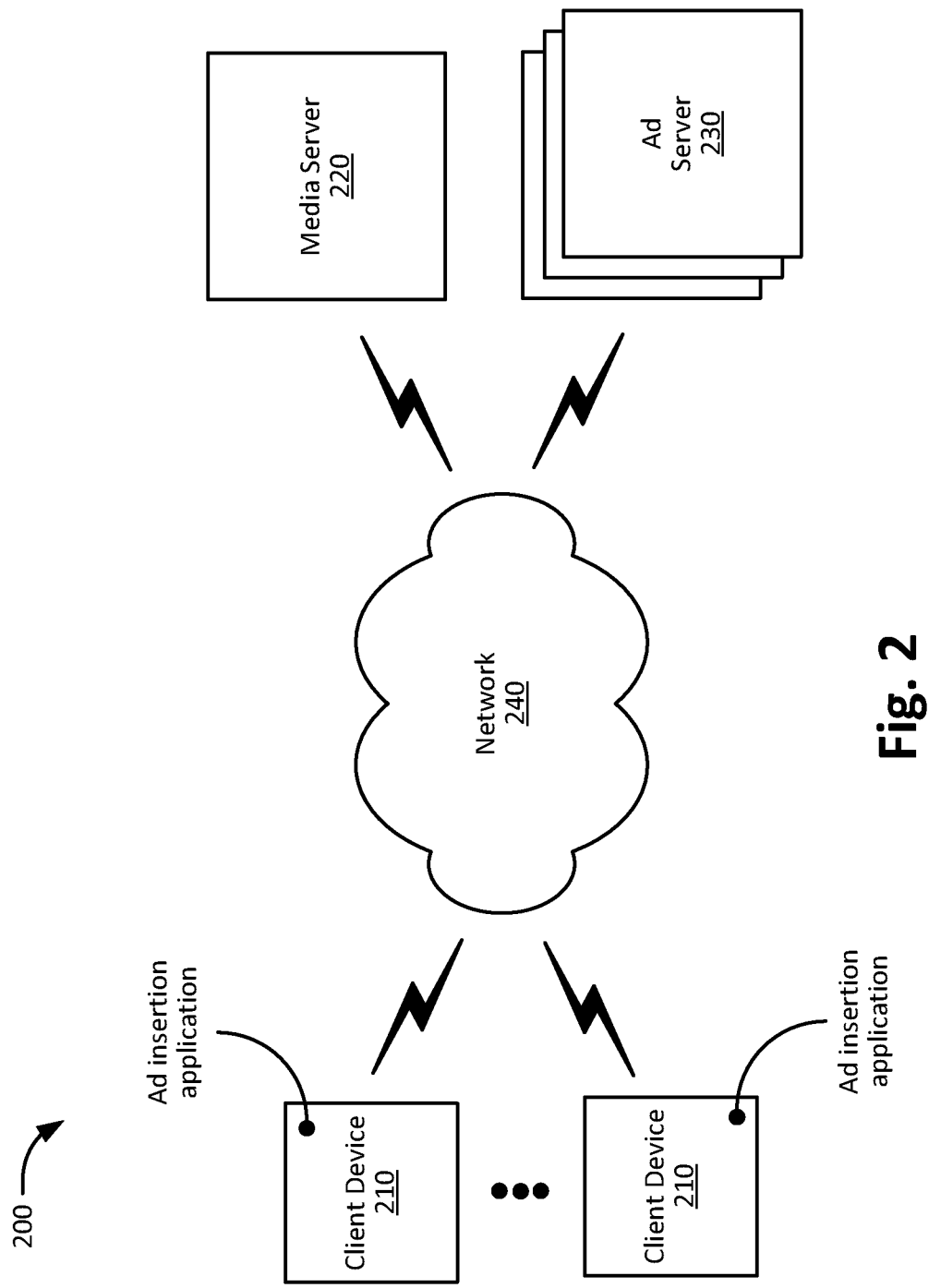
FIG. 2 is a diagram of an example environment in which systems and/or methods described herein may be implemented.

FIG. 2 is a diagram of an example environment 200 in which systems and/or methods described herein may be implemented. Environment 200 may include one or more client devices 210, media server 220, ad server 230, and network 240. As shown, media server 220 and ad server 230 may be implemented by different devices; however, in other implementations, media server 220 and ad server 230 may be implemented by the same device.

Client device 210 may include a portable computing and communication device, such as a personal digital assistant (PDA), a smart phone, a cellular phone, a laptop computer with connectivity to a cellular wireless network, a tablet computer, etc. Client device 210 may also include a non-portable computing device, such as a desktop computer, a consumer or business appliance, or another device that has the ability to connect to network 240. User device 210 may also include a computing and communication device that may be worn by a user (also referred to as wearable devices) as a watch, a fitness band, a necklace, glasses, an eyeglass, a ring, a belt, a headset, or another type of wearable device. In some implementations, client device 210 may include a set top box, a video game console, or a similar device, capable of communicating with media server 220 and ad server 230 via network 240. Client device 210 may include a software program, which enables client device 210, to perform one or more of the operations described herein. For instance, client device 210 may seamlessly insert ad content into streaming media content by alternating between download channels with different download rates.

As mentioned above, media content (e.g., television shows, movies, sporting events, etc.) may be available to a user via a client device (also referred to herein as a user device) that is in communication with a media server. The media content may be streamed or downloaded by the client device, from the media server, and displayed by the client device to the user. Additionally, the media content may be periodically interrupted by an advertisement that is also downloaded by the client device and displayed to the user. As such, the client device may be required to transition from streaming media content to streaming ad content, and then transition back again to streaming the media content once the ad is over.

Such transitions may cause glitches (e.g., abrupt visual interruptions or other undesirable visual effects) as the client device switches back and forth between a media content channel and an ad content channel. In some implementations, a client device may be capable of streaming media content and ad content simultaneously (e.g., via separate channels). However, doing so can impose a significant burden on service provider networks by doubling the bandwidth allocated to client devices. As such, currently available solutions for inserting ads into media content often result in unwanted glitches or cumbersome and prohibitive bandwidth allocations.

Media server 220 may include one or more computing devices, such as a server device or a collection of server devices associated with a content provider that may provide media to client devices 210. In some implementations, media server 220 may be a web server that hosts webpages and/or content (e.g., videos, audio, etc.). Additionally, or alternatively, a link to content stored by media server 220 may be presented within an application or webpage associated with a web server or application server.

In some implementations, media server 220 may provide the media content as part of a multicast communication. The multicast communication may include a multicast group that client device 210 may join to receive the multicast, leave to receive ad content, and then rejoin (after the ad content is finished) to resume receiving the multicast. In some implementations, media server 220 may communicate and collaborate with ad server 230 to provide a combination of media content and ad content to client device 210. The channel used to multicast the media content may be different from the channel used to multicast the ad content.

Ad server 230 may include one or more computing devices, such as a server device or a collection of server devices capable of providing ad content to client device 210. For instance, ad server 230 may determine ad content that is targeted for a user of client device 210 based on user profile information of the user, and may provide the targeted ad content to client device 210 during advertisement segments corresponding to a television show, movie, etc., that is being streamed to client device 210. In some implementations, ad server 230 may provide the ad content to client device 210 at an enhanced download rate that is faster than real-time (e.g., faster than required for the user to be able to see the ad content in real-time). In some implementations, ad server 230 may provide multiple channels of different ad content (e.g., different advertisements) targeted at different types of users. In some implementations, ad server 230 may provide the ad content as part of a multicast communication. The multicast communication may include a multicast group that client device 210 may join to receive ad content and then leave (after the ad content is over) resume receiving media content corresponding to program.

Network 240 may include one or more wired and/or wireless networks. For example, network 240 may include a cellular network (e.g., a second generation (2G) network, a third generation (3G) network, a fourth generation (4G) network, a fifth generation (5G) network, a long-term evolution ("LTE") network, a global system for mobile ("GSM") network, a code division multiple access (CDMA) network, an evolution-data optimized (EVDO) network, or the like), a public land mobile network (PLMN), and/or another network. Additionally, or alternatively, network 240 may include a local area network (LAN), a wireless LAN (WLAN), a wide area network (WAN), a metropolitan network (MAN), the Public Switched Telephone Network (PSTN), an ad hoc network, a managed IP network, a virtual private network (VPN), an intranet, the Internet, a fiber optic-based network, and/or a combination of these or other types of networks.

Figure 3:
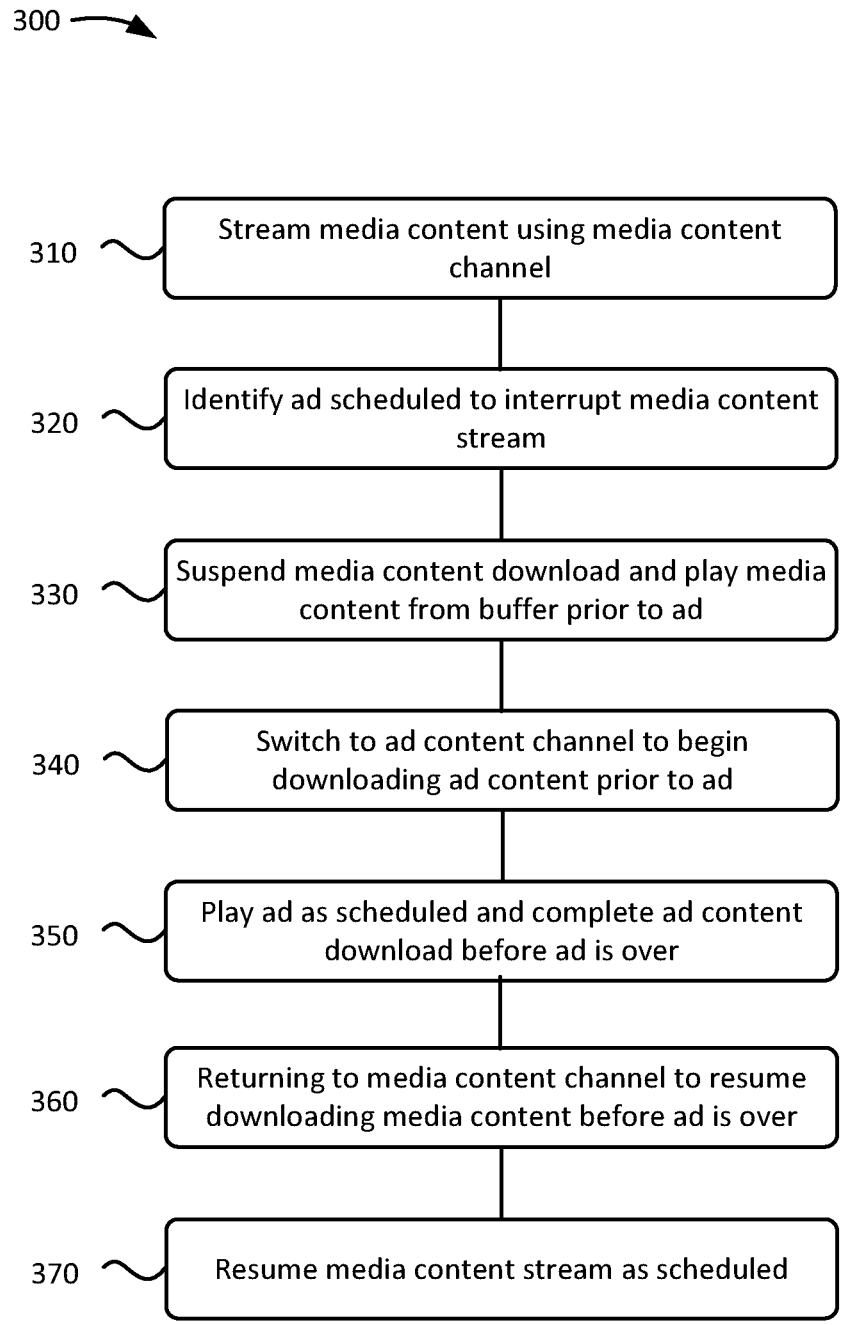
FIG. 3 is a flowchart diagram of an example process for seamlessly inserting an ad into a media content stream.

FIG. 3 is a flowchart diagram of an example process 300 for seamlessly inserting an ad into a media content stream. In some implementations, process 300 may be implemented by client device 210. In some implementations, process 300 may be implemented by one or more of client device 210, media server 220, and/or ad server 230.

As shown, process 300 may include streaming media content using a media content channel (block 310). The media content may be received as a "live" multicast transmission. For example, client device 210 may begin downloading a television program, a movie, a soundtrack, or another type of media content, and present the media content to the user as the media content is being downloaded. In some implementations, client device 210 may implement a buffer for temporarily storing the media content before it is presented to the user. In some implementations, the buffer may help ensure that the, while the rate at which the media content is downloaded may vary, the media content is nevertheless presented to the user in a smooth, consistent manner. In some implementations, client device 210 may be part of a multicast group that is designated (e.g., by media server 220) for receiving the media content stream.

Process 300 may include identifying an ad scheduled to interrupt the media content stream (block 320). For instance, client device 210 may identify a period of time, corresponding to the media content stream, for suspending the media content stream and streaming ad content (e.g., an advertisement) to the user. In some implementations, the ad content may be presented in accordance with a repeating schedule, such as 3-5 minutes of ads after each 20 minute period of media content streaming. In some implementations, the ad content may be presented sporadically throughout the media content stream. In either scenario, client device 210 may determine, in advance, a time for temporarily suspending the media content stream for an ad content stream.

As media content is downloaded by client device 210, the media content may be temporarily stored in a memory buffer of client device 210. Client device 210 may play the media content in the memory buffer. As such, the portion of media content being downloaded may be different from the current playback portion of the media content. Once the media content has been played, the media content may be removed from the buffer.

Process 300 may also include suspending the media content download and playing the media content from a buffer prior to the ad (block 330). For example, before the ad is scheduled to begin, client device 210 may temporarily discontinue downloading additional media content for the media content stream but continue playing the buffered media content. As such, the user may continue seeing the media content even though client device 210 is no longer downloading new media content. In some implementations, client device 210 may suspend the media content download based on a size of the media content stored in the buffer. For instance, if the buffer is storing 20 seconds worth of media content, client device 210 may suspend the media content 20 seconds before the ad is scheduled to begin. In some implementations, the buffer may include a maximum capacity (e.g., 2 minutes of media content) so that the memory available to client device 210 is not over allocated to the buffer.

Process 300 may also include switching to an ad content channel to download ad content prior to the scheduled playback of the ad (block 340). For example, in response to suspending the media content download, client device 210 may leave the multicast channel dedicated to the media content stream and may join another multicast channel dedicated to stream ad content. In some implementations, client device 210 may switch to the ad content channel while media content is still being played from the buffer. Additionally, since the media content download is suspended, client device 210 may begin downloading ad content after switching to the ad content channel. As such, client device 210 may begin download ad content for a scheduled ad while media content is still being played from the buffer. In some implementations, similar to the media content, client device 210 may temporarily store the ad content in the buffer.

Process 300 may also include playing the ad as scheduled and completing the ad content download before the ad is over (block 350). For instance, client device 210 may stop playing the media content from the buffer (if any media content still remains in the buffer) and may begin playing the ad to the user at the scheduled time for the ad. Client device 210 may play the ad content to the user while the remainder of the ad content is being downloaded and buffered by client device 210. In some implementations, the ad content channel may include a download rate that is faster than a download rate required to view the ad in real-time. As such, the amount of memory capacity allocated to buffering the ad content may increase as more ad content is downloaded. Additionally, because of the enhanced download rate of the ad content, all of the ad content may be downloaded before the entire ad (or group of ads) are shown to the user. In some implementations, the advertisement may be downloaded at the same or similar rate as the media content; however, the advertisement may be encoded using a lower bit rate (or otherwise compressed) so that, for example, a 30 second advertisement may be downloaded in only 26 seconds, thereby enable client device 210 to download the advertisement at a rate that is faster than the playback (or real-time) rate.

Process 300 may also include returning to the media content channel to resume downloading the media content before the ad is over (block 360). For example, client device 210 may downloading before the entire ad is shown to the user, client device 210 may leave the ad content channel and return to the media content channel before the entire ad is shown to the user. In some implementations, client device 210 may also resume downloading media content for the media content stream before the entire ad has been shown to the user. In some implementations, the amount of time between the ad content download completing and the entire ad being shown to the user may depend on the download rate of the ad channel and/or the size of the ad content. For instance, if the download rate of the ad content channel and the size of the ad content is such that client device 210 is finished downloading the ad content 20 seconds before the rest of the ad is shown to the user, then client device 210 may be able to download media content for nearly 20 seconds (minus the time required to leave the ad content channel and join the media content channel) before client device 210 begins showing the media content to the user.

Process 300 may also include resuming the media content stream as scheduled (block 370). For instance, client device 210 may continue streaming the media content to the user after the ad content has been shown to the user. Since client device 210 may have already begun downloading a buffering the media content before the ad was over, the transition from displaying the ad content to displaying the media content may be seamless. Additionally, since the media content stream is not over, client device 210 may continue to transition smoothly between the media content stream and the ad content streams, as described above, for the remainder of the media content stream.

As described above, the present disclosure includes a description of client device 210 being capable of performing the operations of process 300. Additionally, the present disclosure also includes corresponding operations being performed by one or more network devices (e.g., media server 220, ad server 230, one or more switches or routers of network 240, etc.).

As another example, just as the above description includes an example of client device 210 switching from a media content channel to an ad channel in order to download an ad, the present disclosure likewise includes ad server 230 (and/or another network device) providing the ad content stream to client device 210. As such, the present disclosure not only includes operations that may be performed by client device 210 (such as some or all of the operations of process 300) but also includes operation that naturally correspond thereto (some or all of which may be performed by one or more network devices (e.g., media server 220, ad server 230, one or more switches or routers of network 240, etc.).

Figure 4:
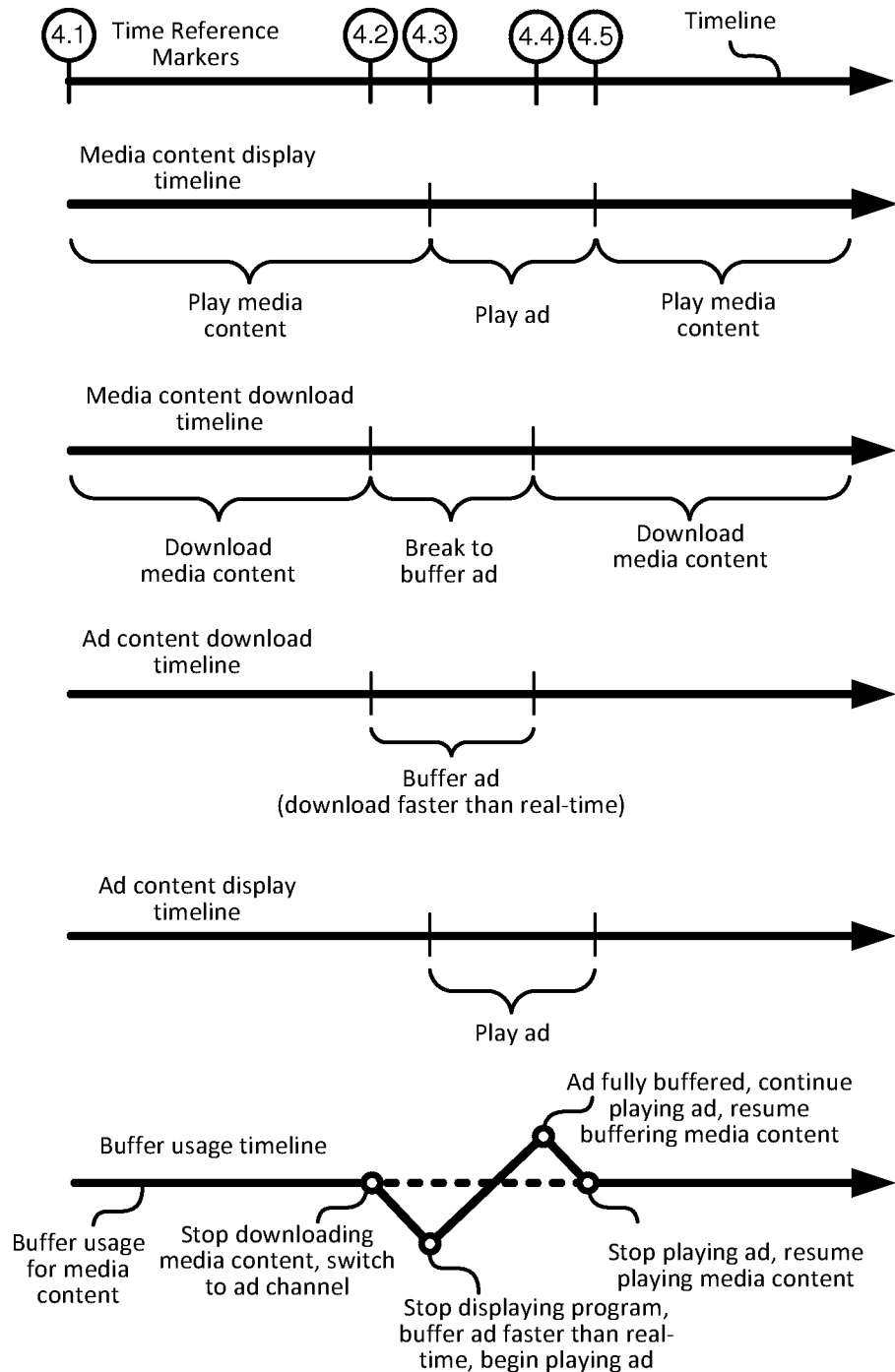
FIG. 4 is a timeline diagram of an example implementation for seamlessly inserting an ad into a media content stream.

FIG. 4 is a timeline diagram of an example implementation for seamlessly inserting an ad into a media content stream. As show, FIG. 4 includes time reference markers (4.1, 4.2, 4.3, etc.), a media content download timeline, a media content display timeline, an ad content download timeline, an ad content display timeline, and a buffer usage timeline.

At time reference marker 4.1, client device 210 may begin streaming media content from media server 220. As shown, this may include client device 210 downloading media content and displaying the media content to a user of the client device 210. While FIG. 4 shows that downloading the media content and displaying the media content may being at about the same time, in some implementations, downloading the media content may begin shortly before displaying the media content since, for example, downloaded media content may be stored in the buffer for a brief period of time prior to displaying the media content. While client device 210 is streaming the media content, the amount of buffer usage may remain constant as represented by the buffer usage timeline.

Comparing the media content download timeline at time reference marker 4.2 with the ad content display timeline at time reference marker 4.3, client device 210 may discontinue downloading media content shortly before the ad is scheduled to play. During this time, client device 210 may continue to play the media content that is being stored in the buffer, as represented by the media content display timeline.

As such, as represented by the buffer usage timeline, the amount of the buffer being used during this period may decrease since the media content is no longer being downloaded but the media content stored in the buffer is being played to the user. In addition, client device 210 may leave the media content channel used to download the media content and join an ad content channel in preparation for downloading ad content for the scheduled ad.

At time reference marker 4.3, user device 210 may stop displaying the media content and begin downloading and displaying the ad content to the user. As described above, the download rate of the ad content channel may be faster than the rate required for live programs or streaming content in real-time. As such, the buffer usage may increase as the ad content continues to be downloaded, and at time reference marker 4.4, the ad content may be completely downloaded, before client device 210 is done displaying the ad content.

Consequently, when all of the ad content has been downloaded, the buffer usage level may be greater than the standard buffer usage level corresponding to stream media content. Additionally, since all of the ad content has been downloaded, client device may transition from the ad content channel back to the media content channel to resume downloading and buffering media content. At time reference marker 4.5, the time allocated to the advertisement may have come to an end. As such, client device 210 may begin displaying the media content that was downloaded and buffered after the transition from the ad content channel to the media content channel.

Figure 5:
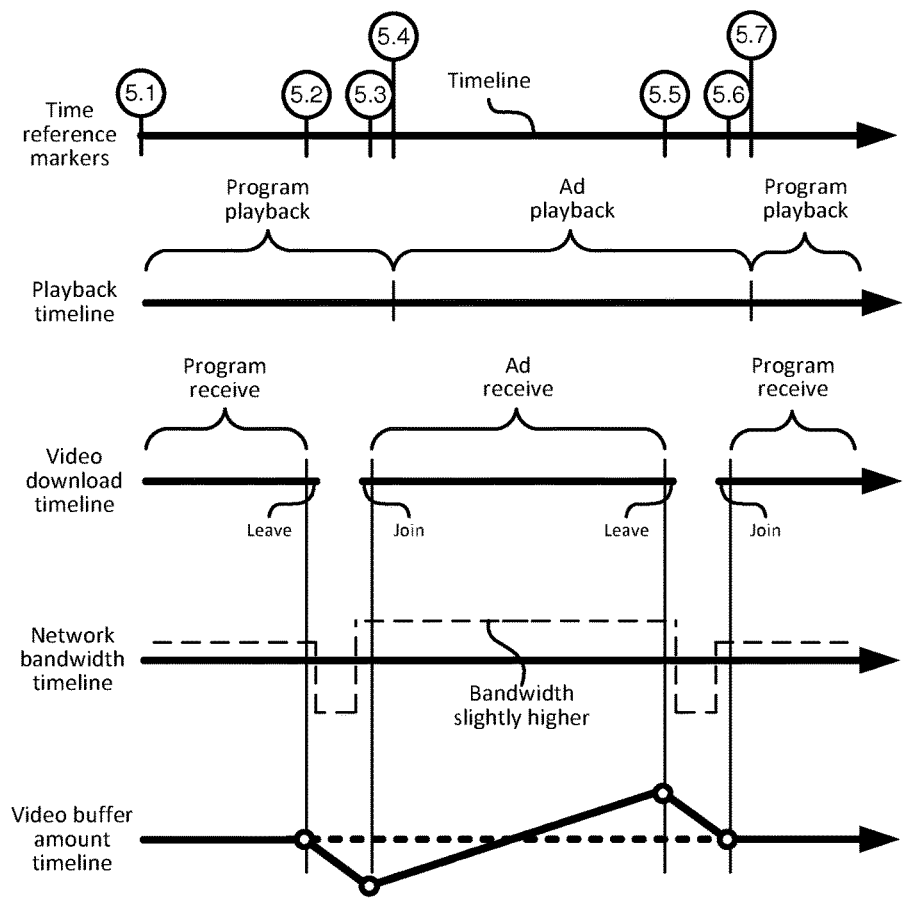
FIG. 5 is a timeline diagram of an example implementation for seamlessly inserting an ad into a media content stream.

FIG. 5 is a timeline diagram of an example implementation for seamlessly inserting an ad into a media content stream. As show, FIG. 5 includes a timeline with reference markers (5.1, 5.2, 5.3, etc.), a playback timeline, a video download timeline, a network bandwidth timeline, and a video buffer amount timeline.

At time reference marker 5.1, client device 210 may begin streaming a program (e.g., media content) from media server 220. As shown, this may include client device 210 downloading and displaying the program to a user of the client device 210. During this time period, the download rate (or network bandwidth) allocated to providing the program may remain at or near a constant rate. Similarly, the amount of memory client device 210 allocates to buffering downloaded video may also remain at or near constant.

At time reference marker 5.2, client device 210 may stop downloading the program and may decide to leave the channel (e.g., the multicast channel streaming the program) of the program. However, client device 210 may continue playing the program from the information stored in the video buffer. These operations may cause a drop in the network bandwidth for downloading the program as well as a decrease in the amount of video buffer being used.

At time reference marker 5.3, client device may join an ad channel (e.g., a multicast channel for streaming ads) and may begin receiving an ad while continuing to play the program from the buffer. The ad may be downloaded at an enhanced rate (e.g., a rate that is faster than real-time), which may cause an increase in network bandwidth usage that is beyond the bandwidth used to stream the program. Notably, however, the change in bandwidth may only be a slight increase (instead of double, for example) since the ad may begin downloading while the program is still being played from the buffer. Additionally, since client device 210 has begun downloading the ad, the buffer amount being used by user device 210 may begin to increase. Shortly thereafter, at time reference marker 5.4, client device 210 may begin playing the ad. In some implementations, the foregoing operations (e.g., the amount of the program that is buffered, the leaving of the program channel, the joining of the ad channel, the downloading of the ad, etc.) may be timed such that there is a seamless transition between playing the program and playing the ad (which may include the last portion of the buffered program being played at the precise moment that the ad begins to play).

At time reference marker 5.5, client device 210 may finish downloading the entire ad and may decide to leave the ad channel, which may cause a decrease in the network bandwidth used to download the ad. In addition, since the ad was downloaded at a rate that was faster than real-time, the video buffer usage amount may be greater than the amount used to buffer programs under normal streaming conditions, and the ad may not have finished playing. As such, client device 210 may continue playing the remainder of the ad from the buffer, thereby causing a decrease in the buffer usage amount.

At time reference marker 5.6, before the ad finishes playing from the buffer, client device may rejoin the program channel and may begin downloading the program at the same or similar rate at which the program was previously downloaded. Because the program begins downloading before the ad is finished playing, client device 210 may buffer the program, such that client device 210 may seamlessly transition from playing the ad to playing the program the moment that the ad is finished playing as indicated at time reference marker 5.7. As such, the network bandwidth used to stream the program and the amount of video buffer used by client device 210 may return to levels that are the same or similar to levels prior to downloading and playing the ad.

Figure 6:
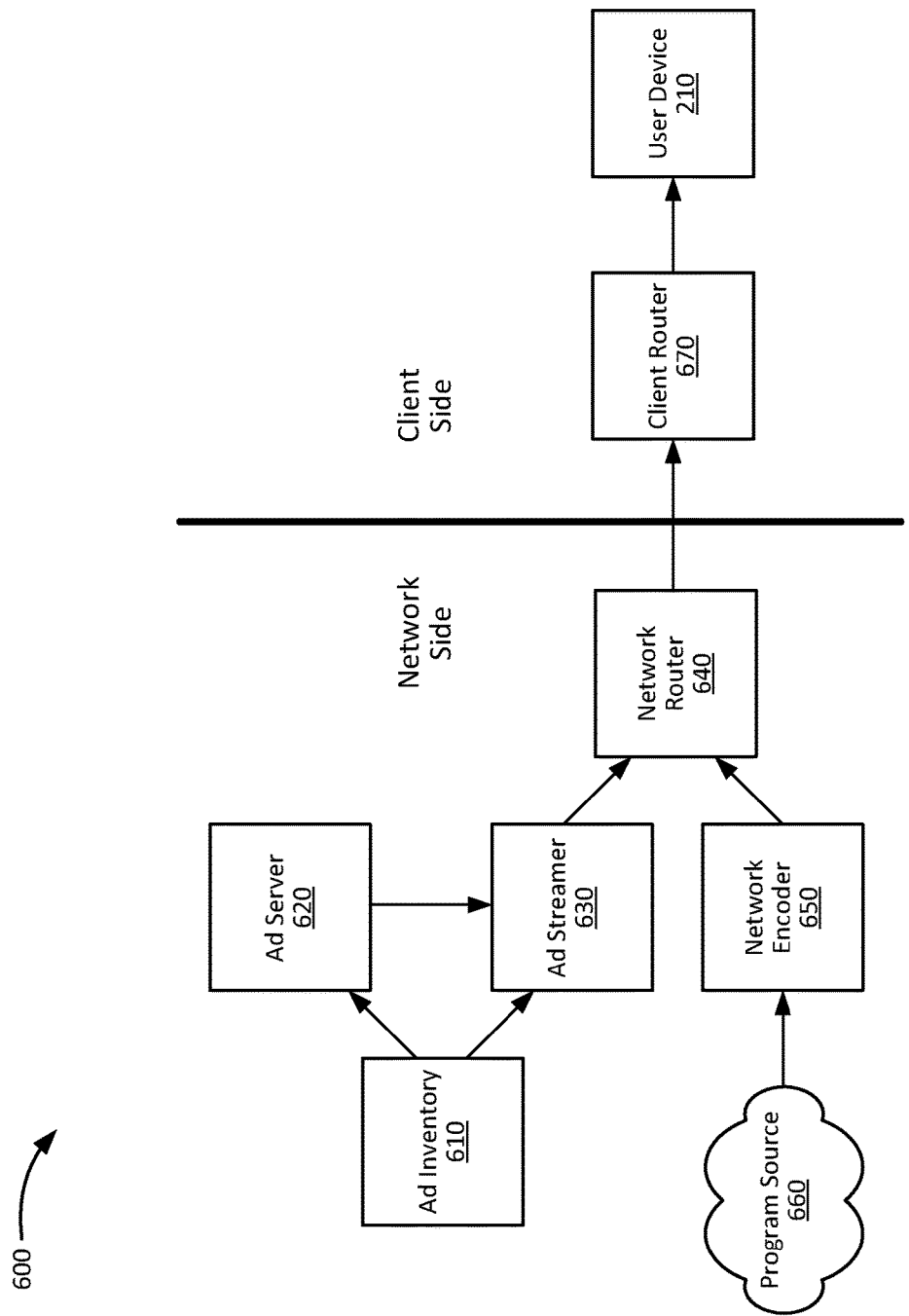
FIG. 6 is a block diagram of an example network for seamlessly transitioning between a program stream and an ad stream.

FIG. 6 is a block diagram of an example network 600 for seamlessly transitioning between a program stream and an ad stream. As shown, network 600 may include user device 210, media server 220, ad inventory 610, ad server 620, ad streamer 630, network router 640, network encoder 650, program source 660, and client router 670. Network 600 is a non-limiting example of network devices that may cooperate to seamlessly transition between program streams and ad streams. In some implementations, network 600 may include additional, alternative, or fewer devices than those shown in FIG. 6. Additionally, operations described as being performed by one of the devices of network 600 may, in some implementations, be performed by one or more other devices.

Ad inventory 610 may include one or more server devices that include a repository of advertisements. The advertisements may include a wide range of advertisements intended for different user demographics, programming schedules (e.g., day time television, prime time television, etc.). Ad server 620 may include one or more server devices that include the logic and processing behind streaming advertisements. For instance, ad server 620 may include logic for matching advertisements to users based on demographic information, interests of the user, the program being viewed by the user, the time of day, etc. Ad server 620 may also include logic for instructing ad streamer 630 regarding which advertisements should be streamed to which multicast groups (e.g., channels), the times and schedules for which advertisements should be streamed, etc.

Program source 660 may include one or more devices and/or networks from which programs may be stored and streamed to user device 210. For instance, program source 660 may include one or more server devices that store programs and other media content for streaming to user device 210. Program source 660 may also include a computer network, an antenna, a satellite network, and/or another means by which the media content may be streamed to network encoder 650. Network encoder 650 may include one or more server devices and/or network devices (e.g., switches, routers, gateways, etc.) that may convert a signal from program source 660 into a format that is germane to the network devices of network 600.

In some implementations, programs and/or advertisements may occur based on specific scheduled time periods that are known well in advance. In some implementations, programs and/or advertisements may be scheduled vaguely (e.g., an advertisement period will occur at some time between 10:00 and 10:15) and are specified more particularly as the time for the program and/or advertisement draws closer (e.g., 5-10 seconds before the advertisement is to begin). For instance, program source 660 may inform network encoder 650 of an up-and-coming advertisement, and network encoder 650 may inform ad server 620 accordingly. In response ad server 620 may select an advertisement from ad inventory 610 and inform ad streamer 630 when to being and end streaming the advertisement.

Network router 640 may include one or more network devices (e.g., switches, routers, gateways, etc.) that may stream programs from network encoder 650 to client router 670. Network router 640 may also stream advertisements from ad streamer 630 to client router 670. Client router 670 may include a network device (e.g., a switch, a router, a gateway, modem, etc.) that may stream programs and advertisements from network 600 to user device 210.

Figure 7:
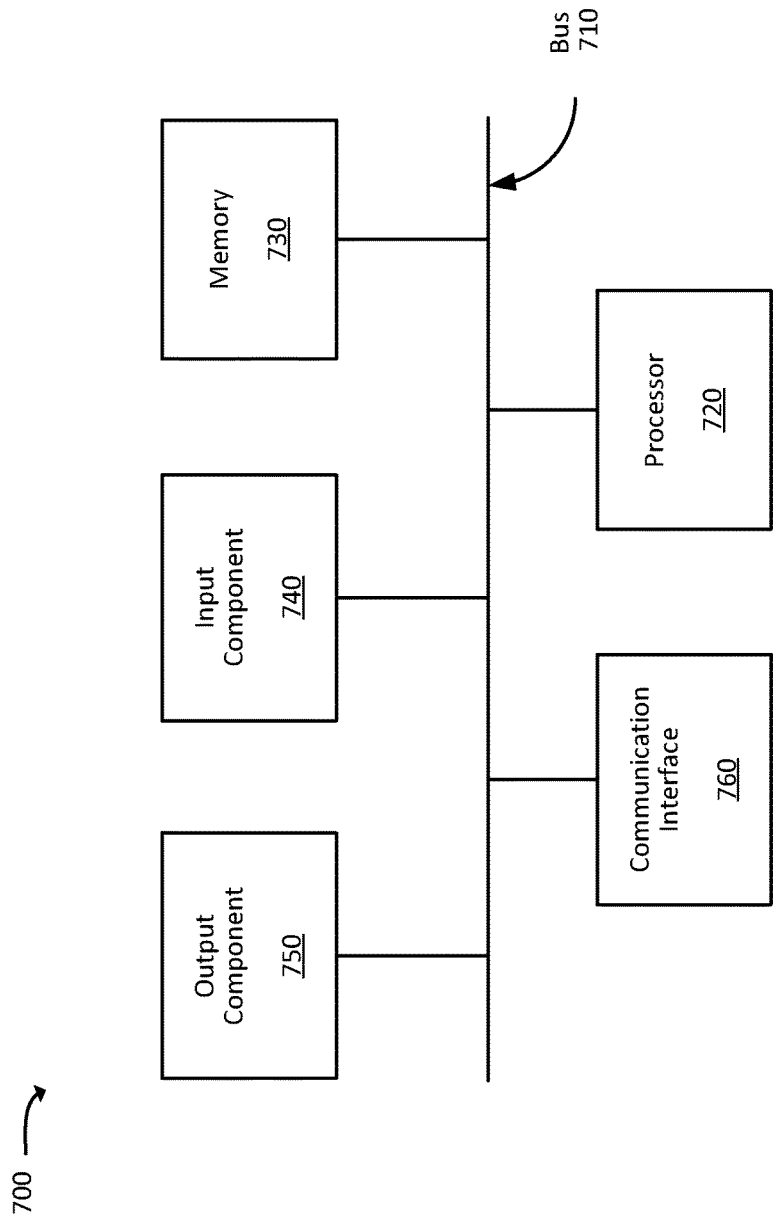
FIG. 7 is a diagram of example components of a device.

FIG. 7 is a diagram of example components of a device 700. Each of the devices illustrated in FIGS. 1, 2, and 6 may include one or more devices 700. Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more light emitting diodes (LEDs), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of lines, arrows, and/or blocks have been described with regard to FIG. 3 the order of the blocks and arrangement of the lines and/or arrows may be modified in other implementations. Further, non-dependent blocks may be performed in parallel. Similarly, while series of communications have been described with regard to several of the Figures provided herein, the order or nature of the communications may potentially be modified in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, performed by a client device, comprising:
   downloading, by the client device via a media content channel, media content, corresponding to a program, to a memory buffer of the client device;
   presenting, by the client device and in real-time, the program, to a user of the client device, based on the media content in the memory buffer;
   monitoring an amount of the media content stored in the memory buffer;
   identifying a scheduled advertisement period corresponding to the program;
   determining whether the amount of the media content stored in the memory buffer is enough to playback the program up to the scheduled advertisement period;
   prior to the scheduled advertisement period corresponding to the program, and in response to determining that the amount of the media content stored in the memory buffer is enough to playback the program up to the scheduled advertisement period,
       discontinuing, by the client device, the downloading of the media content,
       continuing, by the client device, to present the program based on the media content in the memory buffer,
       switching, by the client device, from the media content channel to an ad content channel, and
       downloading, by the client device, ad content, corresponding to an advertisement, to the memory buffer;
   presenting, by the client device and in real-time, the advertisement, to the user, based on the ad content in the memory buffer;
   prior to a scheduled termination of the scheduled advertisement period,
       completing, by the client device, the downloading of the ad content to the memory buffer,
       continuing, by the client device, to present the advertisement based on the ad content in the memory buffer,
       switching, by the client device, from the ad content channel to the media content channel, and
       downloading, by the client device, additional media content, corresponding to the program, to the memory buffer; and
   presenting, by the client device and in real-time, the program based on the additional media content in the memory buffer.

2. The method of claim 1, further comprising:
   joining a first multicast group to download the media content via the media content channel;

leaving the first multicast group to discontinue the downloading of the media content;
joining a second multicast group to download the ad content via the ad content channel;
leaving the second multicast group in response to completing the downloading of the ad content associated with the advertisement; and
rejoining the first multicast group to download the additional media content via the media control channel.

3. The method of claim 1, wherein the ad content is downloaded to the memory buffer at a download rate that is faster than a playback rate of the ad content in the memory buffer.

4. The method of claim 1, wherein:
the media content and the ad content are downloaded at similar download rates, and
the ad content is encoded using a lower bit rate than the media content.

5. The method of claim 1, wherein the scheduled termination of the scheduled advertisement period coincides with a scheduled resumption of the program.

6. The method of claim 1, wherein the presenting of the advertisement coincides with using a final portion of the media content, in the memory buffer, to present the program.

7. The method of claim 1, wherein the presenting of the program based on the additional media content coincides with using a final portion of the ad content, in the memory buffer, to present the advertisement.

8. The method of claim 1, further comprising:
allocating a decreased amount of memory capacity to the memory buffer in response to:
the discontinuing of the downloading of the media content, and
the switching from the media content channel to the ad content channel,
allocating an increased amount of the memory capacity to the memory buffer in response to the downloading of the ad content, and
allocating another decreased amount of memory capacity to the memory buffer in response to:
the discontinuing of the downloading of the ad content, and
the switching from the ad content channel to the media content channel.

9. A client device, comprising:
a non-transitory memory device storing a plurality of processor-executable instructions; and
a processor configured to execute the processor-executable instructions, wherein executing the processor-executable instructions causes the processor to:
download, via a media content channel, media content, corresponding to a program, to a memory buffer of the client device;
present, in real-time, the program, to a user of the client device, based on the media content in the memory buffer;
monitor an amount of the media content stored in the memory buffer;
identify a scheduled advertisement period corresponding to the program;
determine whether the amount of the media content stored in the memory buffer is enough to playback the program up to the scheduled advertisement period;
prior to the scheduled advertisement period corresponding to the program, and in response to determining that the amount of the media content stored in the memory buffer is enough to playback the program up to the scheduled advertisement period,
discontinue the download of the media content,
continue to present the program based on the media content in the memory buffer,
switch from the media content channel to an ad content channel, and
download ad content, corresponding to an advertisement, to the memory buffer;
present, in real-time, the advertisement, to the user, based on the ad content in the memory buffer;
prior to a scheduled termination of the scheduled advertisement period,
complete the download of the ad content to the memory buffer,
continue to present the advertisement based on the ad content in the memory buffer,
switch from the ad content channel to the media content channel, and
download additional media content, corresponding to the program, to the memory buffer; and
present, in real-time, the program based on the additional media content in the memory buffer.

10. The client device of claim 9, wherein executing the processor-executable instructions causes the processor to:
join a first multicast group to download the media content via the media content channel;
leave the first multicast group to discontinue the download of the media content;
join a second multicast group to download the ad content via the ad content channel;
leave the second multicast group in response to downloading all of the ad content associated with the advertisement; and
rejoin the first multicast group to download the additional media content via the media control channel.

11. The client device of claim 9, wherein the ad content is downloaded to the memory buffer at a download rate that is faster than a playback rate of the ad content in the memory buffer.

12. The client device of claim 9, wherein:
the media content and the ad content are downloaded at similar download rates, and
the ad content is encoded using a lower bit rate than the media content.

13. The client device of claim 9, wherein the scheduled termination of the scheduled advertisement period coincides with a scheduled resumption of the program.

14. The client device of claim 9, wherein a beginning of the scheduled advertisement period coincides with a final portion of the media content, in the memory buffer, being used to present the program.

15. The client device of claim 9, wherein the presenting of the program based on the additional media content coincides with a final portion of the ad content, in the memory buffer, being used to present the advertisement.

16. The client device of claim 9, wherein executing the processor-executable instructions causes the processor to:
allocate a decreased amount of memory capacity to the memory buffer in response to:
a discontinuance of the download of the media content, and
a switch from the media content channel to the ad content channel,
allocate an increased amount of the memory capacity to the memory buffer in response to the download of the ad content, and allocate another decreased amount of memory capacity to the memory buffer in response to:
  a discontinuance of the download of the ad content, and
  a switch from the ad content channel to the media content channel.

17. A client device comprising logic to:
a non-transitory memory device storing a plurality of processor-executable instructions; and
a processor configured to execute the processor-executable instructions, wherein executing the processor-executable instructions causes the processor to:
  stream a media program by downloading the media program to a memory buffer of the client device, via a first channel dedicated to multicasting the media program, and by presenting the media program to a user in accordance with a scheduled presentation of the program;
  monitor an amount of the media program stored in the memory buffer;
  identify a scheduled advertisement period corresponding to the media program;
  determine whether the amount of the media program stored in the memory buffer is enough to playback the program up to the scheduled advertisement period;
  prior to the scheduled advertisement period corresponding to the media program, and in response to determining that the amount of the media program stored in the memory buffer is enough to playback the media program up to the scheduled advertisement period,
    switch, from the first channel, to a second channel dedicated to multicasting an advertisement, and
    download the advertisement while the media program is still being presented to the user,
  present the advertisement to the user in accordance with the scheduled advertisement period,
  prior to a scheduled termination of the advertisement period,
    switch, from the second channel, to the first channel, and
    resume the download of the media program, and
  resume, in accordance with a scheduled presentation of the program and in response to the scheduled termination of the advertisement period, the presentation of the media program.

18. The client device of claim 17, wherein the advertisement is downloaded at a download rate that is faster than the rate at which the media program is downloaded.

19. The client device of claim 17, wherein:
the media program and the advertisement are downloaded at similar download rates, and
the advertisement is encoded using a lower bit rate than the media program.

20. The client device of claim 17, wherein the resumption of the program coincides with using a final portion of the advertisement in the memory buffer.

* * * * *